Jan. 10, 1933.  J. H. BANINGER  1,893,836
BEARING MOUNTING
Filed Feb. 16, 1931
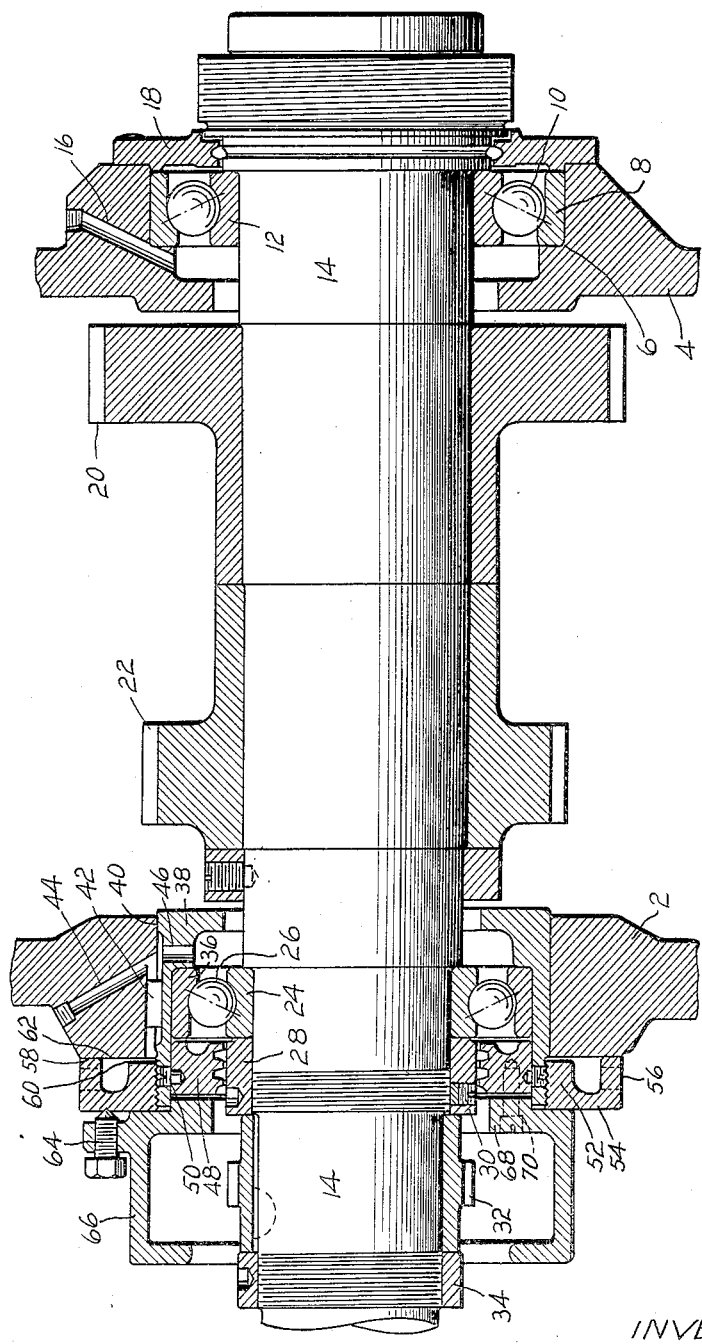
INVENTOR
JOHN H. BANINGER,
BY *[signature]*
HIS ATTORNEY.

Patented Jan. 10, 1933

1,893,836

UNITED STATES PATENT OFFICE

JOHN H. BANINGER, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed February 16, 1931. Serial No. 515,926.

This invention relates to bearing mountings and comprises all the features of novelty herein disclosed. An object of the invention is to provide an improved bearing mounting for a spindle such that a thrust load will be maintained on the bearings in spite of expansion of the spindle and application of external load. Another object is to provide a simple and inexpensive adjusting means for applying an initial, predetermined thrust load to spindle bearings and maintaining a load thereafter.

To these ends and also to improve generally upon devices of this character, the invention consists in the various matters hereinafter described and claimed. In its broader aspects, the invention is not necessarily limited to the specific construction selected for illustrative purposes in the accompanying drawing in which The figure is a sectional view through the axis of the bearing mounting.

The numerals 2 and 4 indicate the side walls of a casing, the wall 4 having a shouldered recess 6 for securing the outer race ring 8 of an angular contact, antifriction bearing 10, herein illustrated as a ball bearing. The inner race ring 12 of the bearing is press-fitted upon a spindle 14 and abuts against a shoulder thereof. Lubricant is admitted through a passage 16 and the outer side of the bearing is sealed by a cap 18 which makes a close running joint with the enlarged end of the spindle. The illustrated spindle is intended for a turret lathe having any suitable chuck and driven in any suitable way, as by gears 20 and 22. Such a spindle is subject to external load which is largely axially directed against the chuck and illustrates one important application of the present invention.

An inner race ring 24 of an angular contact, antifriction bearing 26 is press-fitted on the spindle and clamped against a shoulder by a nut 28 having a locking screw 30. A gear 32 for feed mechanism is shown keyed to the spindle and clamped by a nut 34. The outer race ring 36 of the bearing 26 is carried in a shouldered recess of a flanged bearing housing 38 which is slidably mounted in a cylindrical seat 40 of the casing side wall 2. The bearing housing is held from rotation by a key 42 engaging mating slots in the housing and the casing. Lubricant is introduced through the communicating passages 44 and 46. A sealing washer 48 having grease grooves around the nut 28 is locked in the bearing housing by screws 50 and closes the outer side of the bearing. One end of the bearing housing 38 is externally threaded to receive an adjusting nut 52. The nut has a threaded body portion and an outwardly extending resilient wall 54 with an axially directed annular rim 56. These parts are heat treated in order to form a strong annular spring. The rim 56 is apertured radially for a wrench, the end face 58 being faced off smooth and slightly overhangs a concentric face 60 on the body of the nut. Hence, when the nut is screwed on the bearing housing, the face 58 will first engage a smooth face 62 of the casing 2 and thereafter the nut will give until the face 60 is flush with face 58 and also engages the casing. This puts an initial load on the bearings in the direction of the diverging angular contact lines and all the rolling elements are pressed against their raceways even when external load tends to remove the load from the bearing 26.

The displacement of the faces 58 and 60 is exaggerated in the drawing. In practice, it will be only a few thousandths of an inch but this dimension is so selected that the desired initial thrust load will be placed on the bearings when the face 60 meets the face 62. This engagement is determined by turning the nut a predetermined angular amount and at this point the operator can be sure the desired load is on the bearings but has not been exceeded. When the spindle is in use, especially with modern high speed tools, the work and its spindle heat up, it not being unusual for the rise in temperature of the spindle to reach 50° F. The expansion of the spindle tends to remove the initial load from the opposed bearings but the spring nut acts as an accumulator to continue to move the bearing housing 38 in its seat and to maintain a load. The raceways of rings 8 and 36 face away from each other so that the load has a tendency to expand the housing 38 against the seat 40 but decrease of the load lessens the expansive effect and facilitates the sliding of the housing. The amount of spindle expansion can be calculated from the rise in temperature, the co-efficient of expansion, and the distance between the bearings. Now if the casing walls 2 and 4 were absolutely rigid, the amount of overhang of the face 58 beyond the face 60 could be substantially the same as the amount of spindle expansion plus an excess to insure the desired load after external load is applied and expansion is complete.

The setting up of the nut 52, however, causes the casing walls 2 and 4 to give or spring inwardly to some extent. Hence when the spindle expands, the walls tend to return and so compensate for some of the spindle expansion. There is also a small amount of compensatory expansion of the outside casing due to heat. Hence the distance between faces 58 and 60 is so selected in relation to spindle expansion, external load and other disturbing forces that there is still a thrust load on the bearings to hold all of the rolling elements pressed against their raceways.

Nut 52 can be conveniently locked in adjusted position by a cone-pointed screw 64 carried on a lug of the guard plate 66. The guard plate has a flange 68 secured to the washer 48 by screws 70, an extension of the flange seating in the bearing housing 38. Maintenance of a load throughout spindle expansion allows a longer spindle to be adequately supported by two spaced bearings without necessity for a third bearing or other means to prevent deflection or whip at the middle portion of the spindle. The spring nut with the two faces offset a predetermined amount provides an exceedingly simple means to adjust the load to the desired degree initially without necessity for further attention in maintaining a load thereafter.

I claim:

1. In a bearing mounting, a casing having side walls, a spindle, opposed angular contact antifriction bearings between the spindle and the side walls, a housing for the outer race ring of one of the bearings, the housing being slidably seated in one of the side walls and having a threaded portion, a nut carried on said threaded portion and arranged to engage the side wall to put an initial thrust load on the bearings, the nut comprising a body portion and a resilient wall carrying an axially directed rim, the rim having an end face overhanging the body of the nut, the amount of overhang being selected to require a predetermined force to bring the end face of the rim flush with the body portion, the amount of overhang also being greater than the amount of spindle expansion whereby the nut maintains a thrust load on the bearings throughout the expansion; substantially as described.

2. In a bearing mounting, a casing having side walls, a spindle, opposed angular contact antifriction bearings between the spindle and the side walls, a housing for the outer race ring of one of the bearings, the housing being slidably seated in one of the side walls and having a threaded portion, a nut carried on said threaded portion and arranged to engage the side wall to put an initial thrust load on the bearings, the nut comprising a body portion and a resilient portion overhanging the body portion and arranged to give upon contact with the side wall, and the amount of overhang being predetermined to maintain a load on the bearings when extraneous forces change the initial relations of the adjacent inner race ring and side wall; substantially as described.

3. In a bearing mounting, a casing having side walls, a spindle, opposed angular contact antifriction bearings between the spindle and the side walls, a housing for the outer race ring of one of the bearings, the housing being slidably seated in one of the side walls and having a threaded portion, a nut carried on the threaded portion and arranged to engage the side wall to put an initial thrust load on the bearings, and the nut having a portion to maintain a pressure contact with the side wall when operating conditions change the initial relation of the side wall and the adjacent inner race ring; substantially as described.

4. In a bearing mounting, a casing having side walls, a spindle, opposed angular contact antifriction bearings between the spindle and the side walls, a housing for the outer race ring of one of the bearings, the housing being slidably seated in one of the side walls, a screw threaded member engaging the housing and the side wall to move the housing and apply an initial thrust load to the bearings, said screw threaded member having a resilient portion to maintain an axial pressure on the housing when the spindle expands and is subject to external load; substantially as described.

5. In a bearing mounting, a casing having side walls, a spindle, opposed angular contact antifriction bearings between the spindle and the side wall, a housing for the outer race ring of one of the bearings, the housing being slidably seated in one of the side walls, and a single device having a rigid and a yieldable portion for effecting a predetermined, positive, initial thrust load on the bearings and for thereafter resiliently moving the housing to maintain a load not exceeding the initial load when the spindle expands or is subject to external load; substantially as described.

6. In a bearing mounting, a casing having side walls, a spindle, opposed angular contact antifriction bearings between the spindle and the side walls, one of the race rings of one bearing being axially adjustable with respect to the corresponding race ring of the other bearing, and a nut for effecting adjustment of said race ring to put an initial thrust load on the bearings, the nut comprising a threaded body portion and a resilient portion overhanging the body portion and arranged to give until flush with the body portion; substantially as described.

7. In a bearing mounting, a casing wall having a seat, a bearing housing slidable in the seat, an angular contact bearing in the housing, a spindle journalled for rotation in the bearing, and a nut for sliding the housing to apply an initial thrust load to the bearing, the nut having a resilient portion to maintain a thrust load when the inner race ring of the bearing shifts its initial relation to the casing wall; substantially as described.

8. In a bearing mounting, a casing, a spindle, opposed angular contact antifriction bearings between the spindle and the casing, one of the race rings of one bearing being axially adjustable with respect to the corresponding race ring of the other bearing, a nut for effecting adjustment of said race ring to put an initial thrust load on the bearings, the nut comprising a threaded body portion and a resilient portion, and co-operating abutments for the body portion and the resilient portion, the body portion being initially spaced from its abutment and arranged to engage the latter when the resilient portion is deflected a predetermined amount by engagement with its abutment; substantially as described.

In testimony whereof I hereunto affix my signature.

JOHN H. BANINGER.